United States Patent
Berger

(10) Patent No.: US 6,269,347 B1
(45) Date of Patent: *Jul. 31, 2001

(54) METHOD FOR CALCULATION OF A REDUCED INTEREST MORTGAGE PAYMENT PLAN

(76) Inventor: Jay M. Berger, 7 Bala Ave., Suite 202, Bala Cynwyd, PA (US) 19004

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,852

(22) Filed: Nov. 17, 1998

(51) Int. Cl.$^7$ .................................................. G06F 17/60
(52) U.S. Cl. ................................................................ 705/38
(58) Field of Search ............................................ 705/38, 36

(56) References Cited

U.S. PATENT DOCUMENTS

| | | | |
|---|---|---|---|
| 4,739,478 | * | 4/1988 | Roberts et al. ............... 705/38 |
| 5,058,009 | * | 10/1991 | Yoshino et al. ............... 705/38 |
| 5,673,402 | * | 9/1997 | Ryan et al. ..................... 705/38 |
| 5,689,649 | * | 11/1997 | Altman et al. ................. 705/36 |
| 5,878,404 | * | 3/1999 | Stout, Jr. et al. .............. 705/38 |

FOREIGN PATENT DOCUMENTS

WO 00/67169 * 7/1997 (WO) .................. G06F/17/60
WO97/27549 * 11/2000 (WO) .................. G06F/17/00

OTHER PUBLICATIONS

"Sanwa Ball Offers Loan Patent Refunds"–2/98/ Business Editors pp 19–21.*
"Accounting For Impaired Loans"—Ward Dan—National Public Accountant V4n4 pp19–21.*

* cited by examiner

Primary Examiner—V. Millin
Assistant Examiner—Geoffrey Akers
(74) Attorney, Agent, or Firm—Robert B. Famiglio; Famiglio & Associates

(57) ABSTRACT

A method for calculating a mortgage which provides application of mortgage payments to principle first and then interest in the amortization schedule of repayment of a conventional loan is disclosed. The disclosure provides a method for calculating mortgage payments on a conventional mortgage loan by applying such payments first to reduction of principle while accumulating accrued interest. Payments are applied towards accrued interest after the principle amount of the loan is reduced.

4 Claims, 1 Drawing Sheet

| | Table 1 | Table 2 | Table 3 | Table 4 |
|---|---|---|---|---|
| Amount | $100,000.00 | $100,000.00 | $100,000.00 | $100,000.00 |
| Interest Rate (in percentages) | 7% | 7% | 7% | 7% |
| Monthly Payment | $665.30 | $665.30 | $456.19 | $583.33 |
| Term of Loan | 360 mo. | 216 mo. | 360 mo. | 257 mo. |
| Total Interest | $139,508.00 | $43,704.00 | $64,228.00 | $49,915.00 |

FIGURE 1

|  | Table 1 | Table 2 | Table 3 | Table 4 |
|---|---|---|---|---|
| Amount | $100,000.00 | $100,000.00 | $100,000.00 | $100,000.00 |
| Interest Rate (in percentages) | 7% | 7% | 7% | 7% |
| Monthly Payment | $665.30 | $665.30 | $456.19 | $583.33 |
| Term of Loan | 360 mo. | 216 mo. | 360 mo. | 257 mo. |
| Total Interest | $139,508.00 | $43,704.00 | $64,228.00 | $49,915.00 |

METHOD FOR CALCULATION OF A REDUCED INTEREST MORTGAGE PAYMENT PLAN

FIELD OF THE INVENTION

The present invention relates to a new concept in home mortgages or other investment type mortgages that include a plan which provides a substantial reduction of the total amount of interest which is paid over the life of the loan, for any given interest rate. The method of the invention also provides for a rapid buildup of equity as compared to the limited reduction of principal created by conventional mortgage loans. The concept disclosed provides a means in which a borrower may reduce loan principal due to the lender, at a faster rate, under any given loan interest rate, by applying regular payments to principal first, thereby substantially reducing the amount of interest actually paid during the life of the loan.

BACKGROUND OF THE INVENTION

The economics and life styles of America are built on the basic home mortgage, whether it be 15 year, 30 year or some other term of repayment. Normally, and most conventionally, home mortgages and other such loans are amortized using a formula which provides that payments over the term of the loan are allocated to interest first. In the later years of repayment, a significant portion of the monthly loan payment, serves to reduce the principal due on the loan.

Frequently, individuals or companies borrowing money on a conventional loan basis resell or refinance the property which was acquired by the use of the loan proceeds. Homeowners sometimes resell the house they have purchased within five or ten years after the date they acquired the property. At such a time, loan proceeds from a mortgage used to acquire a residential property must be repaid from the funds created at settlement of the property. Naturally, in a conventional mortgage, most of the monthly payments provided to the financial institution providing the funding are applied toward repayment of interest, leaving very little to service the principal to reduce same. Therefore, for many homeowners or business owners selling their property or business, there is very little equity available from the sale of the property during the early years of the life of the loan.

A traditional mortgage allows affordable monthly payments over a long term, and enables the mortgagor to build meaningful equity only after many years of payments have been made. Combined with rising real estate values and normal (or sometimes abnormal) inflation, the mortgagor was able to create a modicum of wealth through the accumulation of appreciation of the value of the property. However, with inflation low and under control for quite some time, and with stability of housing prices which reflects such low inflation, it is more difficult for homeowners or business owners to create equity in the property they're paying off, especially during the early years of a conventionally amortized loan.

For a long time, the success of America was based on population growth leading to housing booms, (i.e., more population growth), in turn leading to more housing booms—all of which leads to more mortgages being issued by financial institutions. Though interrupted by wars, the cycles of business, and the insecurity of the stock-market and other investments, housing growth remains as one of the most accurate measures of America's economic pulse. There have been numerous kinds of mortgages used to facilitate the financing of real property, but the most common provisions require the borrower to pay equal periodic installments, which include an interest payment and a principal payment, over a period of time until the mortgage was paid. The premise of the agreement between lender and borrower is based on a specific interest rate for a specific number of payments over a specific term. This has been the backbone of the home mortgage for some time, although when fluctuations in the interest rates that banks offered caused new methods of interest calculations and payments to be invented, such new methods give rise to new mortgage "products". Banks have instituted a variety of new mortgage "products" such as the adjustable rate mortgage ("ARM") which permits the rate, and therefore the borrower's payments, to fluctuate, usually along with some other market instrument, to maintain the bank's profitability. However, the conventional fixed-rate mortgage has remained the most popular loan. There is normally very little equity in the homeowners property in the first five or ten years of a 30 year amortized loan.

The present invention provides an alternate plan in which monthly payments are made such as in an otherwise conventional mortgage, in a simple, more reliable, mortgagor-attractive mortgage plan. This system gives the bank a new product to offer their investors which can provide for rapid return of principal in which, in certain scenarios, may be of interest to such a mortgage investor. At the same time, and it provides a very attractive means to market mortgage money to borrowers.

There is a certain category of investor, perhaps foreign investors and other such special categories, in which the investor requires a return of principal from an accounting point of view and a deferment of interest received. By using the method described in the present invention, such investors can defer receipt of interest payments until a considerable time in the future, since the payments being provided in the early years of the loan are applied to principal only, with interest being accrued and deferred. Such investors are simply recovering, therefore, principal that they have invested and do not receive income by way of interest until later in the loan payments schedule, or upon payment of the entire loan amount. At such time, such an investor would receive any remaining principal yet unpaid, along with accumulated interest which has accrued in accordance with the present invention. There may be other categories of investors which for, one reason or another, wish to refrain from booking interest as income on investment loans until a later period in time. By using the scheme described and illustrated, such investors would not be receiving interest payments until considerably into the life of the loan.

SUMMARY OF THE INVENTION

The present invention relates to a method for operating and implementing a mortgage plan which comprises, determining an amount of mortgage for which an applicant would qualify and a priority schedule of repayment of principal based on otherwise conventional lending practices, creating an accelerated payment schedule for the principal amount of such mortgage so that the principal is repaid within a shorter time than would otherwise be the case during a given term of the mortgage, applying the entire amount of each payment to principal first, while accumulating interest due. Thus, the total actual accumulated interest paid on the principal of the loan is greatly reduced for a given interest rate. Also, the amount of equity that the borrower has in the property or business, being financed, increases much faster than with what normally would be the case using a conventional amortized schedule of repayments over a given loan or mortgage term.

Preferably, the accelerated equity payment schedule is created by providing a monthly mortgage payment plan, and the equity buildup in the loan is demonstrated by way of an amortized schedule illustrating the principal pay-down by application of payments to such principal first. In this system and method, all paperwork in connection with the mortgage plan is generated before the mortgage is implemented, and computer means are utilized to operate and implement the mortgage plan by providing a breakdown of the payment allocation using well-known arithmetic formulas.

The system of the invention includes the respective means to carry out the previously described method steps. Preferably the means for creating an accelerated principal payment schedule is a monthly mortgage payment plan, and the accelerated equity accumulation and reduced interest payment can be illustrated as shown in examples disclosed with the present invention.

The accelerated principal payment schedule is a monthly mortgage payment plan, and the investment vehicle for financial institutions interested in offering such a program are those investors providing mortgage money for placement which have a need to have a principal return in their investment much faster than what arguably may be possible in a conventional loan scenario. Also, since payment of interest is fully deferred until all principal has been repaid, income is not received by the lender until the time that all principal is recovered. There are certain investment opportunities for financial institutions providing mortgage money which are enhanced because in such investors require return of principal much faster than normally available and have deferred interest income which, in some scenarios, may be desirable for many reasons.

BRIEF DESCRIPTION OF THE DRAWINGS

FIG. 1 is an illustrative table comparing essential parameters in four different loan scenarios for purpose of comparison.

DETAILED DESCRIPTION OF THE INVENTION

The present invention includes a very specific methodology for projecting fixed monthly payments over a specific term, while also creating an equity accelerated loan, with amounts paid by the borrower for repayment of the loan automatically applied to principal of the loan first, as opposed to applying to interest payments in the conventional fashion. Because there are fixed loan payments calculated in the beginning of the loan, and since such loan payments are applied entirely to principal first, there is less total interest paid over the life of the loan for any given interest rate. Preferably, this loan or mortgage will be a home loan for acquisition of the principal residence so that the mortgagor can receive maximum benefits of the equity thereby accrued in their home for return upon resale. The loan product described may have certain marketing appeal for financial institutions looking for a new type of mortgage to present which has an attraction for borrowers. There are also categories of investors which likely could benefit from such a deferment of interest.

Turning now to FIG. 1, a comparison of the different loan examples are shown by summarizing the parameters of four different schedules of loan repayment. Each reference to an appendix is also equivalent to the reference of the like-numbered example number. Appendix 1, i.e. Example 1, is a conventional 30 year loan with an amortized schedule of payments in the amount shown, for the interest rate and the principal shown. In each column to the left in FIG. 1, the parameters of the loans are labeled. The line labeled as amount is the principal of the loan in each example. The interest rate is the loan interest to be charged and accumulated, as described. The monthly payment is self-explanatory and as described in the present disclosure. The term of the loan is the number of months of payments until the loan is essentially paid to zero. The total interest line is that amount of interest paid over the life of the loan, allowing comparison of conventional loan interest in Appendix 1 with that as scheduled in the various examples otherwise illustrated and appended. Below is described the details of each example.

The most common system for making required payments of a mortgage is the monthly payment of principal and interest and applying principal to the balance of the mortgage. Such a conventional mortgage requires the payment of a fixed amount, each month, with a varying amount being applied first to amortized interest and then the balance of the payment to the remaining principal. For example, assuming a conventional mortgage loan of $100,000, with interest set to 7% per year, paid twelve times per year, the monthly mortgage payment would be $665.30. This entails a conventional amortization schedule such is that attached hereto as Appendix 1 for illustration, providing a reduction of principal amount of $81.97 the first month, with the first payment being also allocated to interest payments in the amount of $583.33. The principal balance due on the loan is not greatly reduced during the early years of the loan payment schedule. As can be seen by the table, and is well-known in the accounting fields, the amount of the payments going to satisfaction of interest is most of the payment, in the illustration being almost 90% in the beginning.

The benefits of the present system are:
1. Total interest paid by the borrower to the lender over the life of the loan is greatly reduced, for a given fixed interest rate;
2. After a relatively short term, equity buildup by immediate reduction of principal, is very substantial;
3. The home equity available to the homeowner is radically increased over a short term; and
4. The interest payments to the investor being delayed, in some situations, can be a tactical advantage depending upon the needs of such mortgage investor.

The bank or lender has the ability to place yet one more types of investment in their portfolio of available options to such potential mortgage investors. The benefits to the financial institution offering these investment vehicles, or the benefit to the ultimate investor who may be interested in such investment vehicles, include:
1. Providing an increased variety of available investment vehicles to any type of mortgage investor or the shareholders of the bank;
2. The bank or financial institution has the ability to attract an additional category of investor who has a financial or tax-driven need to recover principal first and to defer the receipt of interest which is income.

EXAMPLES

The appendices provided are examples of payments required under the mortgage of the present invention as it would be calculated under actual conditions. Loan Example 1 shown in Appendix 1 is a conventional loan, showing a principal amount of $100,000 with an interest rate of 7%. As can be seen, using conventional loan calculations and amortizing the loan over 360 months (30 years), the payment of principal interest would be fixed for each monthly payment period in the amount of $665.30. The total amount of interest paid over the life of the loan is $139,508.00. To use the method of the present invention, the conventional loan calculation program allows the user of a conventional personal computer to enter the amount of the loan, the rate of the loan, the payment schedule and other parameters of the loan. By providing a simple calculation that brings interest forward and accumulated each month, payments can be first allocated to principal using the same rate of payment which one would calculate in the conventional loan scenario shown in Appendix 1.

Example 2 is an example which assumes a principal loan amount of $100,000, with a payment period of 216 months, being 18 years. The nominal annual interest rate is 7% and the loan payment per month is $665.30. While the loan payment for each monthly period remains the same over the life of the loan, it would be appreciated that the full monthly payment is applied toward principal due until payment number 150. At such a point, it can be seen that the principal of the loan is almost entirely repaid. During payment in month 151, while some of the payment is applied toward the balance of the principal due to reduce it to zero, interest which has accrued on the balance of the principal due begins to be repaid.

It will be appreciated that there is a table of interest accrued shown in the Example, illustrating how interest is carried forward, adding the interest due on the unpaid principal each month and simply adding it so that the accrual of interest is carried forward and payment of such interest begins much later in the life of the loan. In Example 1, therefore, to make the loan attractive, understandable, or just to enhance the comfort level that a consumer of loans may have with this new approach, a conventional loan schedule may be used and presented to the borrower so that they may compare their payments and total interest paid with the new presentation shown in Example 2. An average consumer of the loan will readily understand that their payment is identical to a 30 year mortgage payment schedule, but the term of the loan to pay off the entire balance has been reduced to 216 months and that total interest paid over the life of the loan is reduced to $43,704.00.

Appendix 3 is an example which shows a 360 month mortgage, the 30-year mortgage frequently used by home-owners. The numbers used to calculate this loan were based not on an equivalent of the monthly payment as in Example 1 and Example 2, but rather the equivalent of the term of payment over the conventional loan term in Example 1. The conventional loan term in the Example 1 shown in Appendix 1 is 360 months. Bringing this term into the calculation for Example 3 yields a monthly payment of $456.19. While this is a lower payment than a conventional mortgage benchmark shown in Appendix 1, it will also be noticed and appreciated by those skilled in this art that there is an increase in the total balance due in the early part of the loan life. While this particular product may be of advantage to certain consumers ultimately, it will also be known to those skilled in the art that consumers of loans do not, for psychological reasons or other reasons, prefer loan products that actually increase the amount due, even if only a temporary phenomenon caused by the accounting which presents a loan reduction sequence as fully illustrated in Example 3 attached as Appendix 3. The interest paid over the life of the loan is greatly reduced over the conventional scenario, showing a total amount of $64,228.00 interest. Using a principal balance of the loan of $100,000 to start, with a nominal annual interest rate of 7% compounded monthly, it will be appreciated that each monthly payment of $456.19 is applied to principal first until mortgage payment 219. At such time, accrued interest of $64,226.63 begins to be reduced through the balance of the payments—assuming that the loan has not been refinanced or repaid prior to such time.

In Example 4, shown in Appendix 4, the calculation of payments is for a similar amount of principal, being $100,000. The life of the loan is 257 months, with an interest rate of 7% as in the Example before. The Example, once again, illustrates how interest is accrued each month until payment 171. At such point, payments begin to pay-down the accrued interest. In Example 4 shown in Appendix 4, it will be appreciated that the advantages of lower payments over a conventional loan, without the disadvantage of negative amortization can be accomplished by taking maximum interest which would accrue on the first payment in Example 2, and provide that as the payment, in this case $583.33, to be made each month. Running through the calculation using a conventional computer program would thereby yield a term of 257 months and a total interest to be paid over the life of such loan in Example 4 of $49,915.00. In both cases, Example 4 shows a loan scenario and payment schedule in which the monthly payments are less than the conventional loan schedule in Example 1, the term of the loan is less, and the total interest paid is considerably less. At the same time, the total due on the loan never increases. Therefore, while any of the above methods work and provide savings to those customers or clients of financial institutions that are interest in the other advantages of deferred interest, the preferred method would likely be that illustrated in either Example 2 or Example 4 as described above.

In the preferred embodiment of the present invention, a conventional computer is used to implement the mortgage calculations shown in the various examples. The inventor utilizes a particular product known as "Timevalue software", which is a well-known industry product used for loan amortization and compound interest calculations. One skilled in the art of calculating principal, interest and other accounting variables will no doubt immediately identify a variety of different sources that can be used to calculate the payments and allocation of payments which would result from the implementation of the principal reduction first plan described herein.

Although the invention has been described in terms of the preferred embodiment and with particular examples that are used to illustrate carrying out the principals of the invention, it would be appreciated by those skilled in the art that other variations or adaptations of the principal disclosed herein, could be adopted using the same ideas taught herewith. Such applications and principals are considered to be within the scope and spirit of the invention disclosed and is otherwise described in the appended claims. Such adaptations include use of different interest rates, terms, principal loan amounts or other parameters.

What is claimed:

1. A method of implementing a fixed term loan repayment plan which comprises:

determining an amount of loan principal to be provided;

calculating a repayment schedule based on a conventional loan amortization table for a given interest rate, repayment term and the selected principal amount;

providing a repayment schedule which applies such monthly payments to repayment of principal due on said loan first;

accumulating interest payable and adding such to the principal amount due; and applying said term payments to reduction of interest due only after the principal has been repaid.

2. A method of lending money which provides for a deferment of interest received by the lender comprised substantially of the steps of:

calculating a principal amount to be lent to a borrower; and deciding a fixed monthly payment amount which will allow reduction of the principal amount each payment period while applying each payment to the reduction of principal of the loan only, calculating monthly interest and carrying said amount forward in the principal balance, and applying such term payments to interest only after all the principal amounts of said loan have been paid first.

3. A method of lending money which provides for a deferment of interest earned by the lender comprised substantially of the steps of calculating a periodic payment which will be applied to the reduction of the principal amount of such loan; calculating the periodic interest on the balance of said principal and accruing and carrying the balance of said accumulated periodic interest forward, and thereafter applying any periodic payments on the loan towards reduction of said accumulated interest only after the principal amount of said loan has been paid down to zero.

4. A method of lending money, which provides for a deferment of the repayment of interest, comprised substantially of applying all periodic loan payments first toward reduction of only the principal amount of the loan, and accumulating and deferring the payment of any interest on the principal until the original principal balance is substantially zero, and thereafter applying loan payments to reduce the accumulated interest without compounding interest for such accumulated and deferred interest amounts.

\* \* \* \* \*